US011230935B2

United States Patent
Huizenga et al.

(10) Patent No.: US 11,230,935 B2
(45) Date of Patent: Jan. 25, 2022

(54) STATOR COMPONENT COOLING

(71) Applicant: General Electric Company, Schenectady, NY (US)

(72) Inventors: Benjamin Scott Huizenga, Cincinnati, OH (US); Darrell Glenn Senile, Oxford, OH (US); Robert Alan Frederick, West Chester, OH (US); Paul Joseph Kreitzer, West Chester, OH (US)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 14/857,865

(22) Filed: Sep. 18, 2015

(65) Prior Publication Data
US 2017/0081966 A1 Mar. 23, 2017

(51) Int. Cl.
*F01D 9/00* (2006.01)
*F01D 9/04* (2006.01)
(Continued)

(52) U.S. Cl.
CPC .............. *F01D 9/041* (2013.01); *F01D 5/02* (2013.01); *F01D 5/186* (2013.01); *F01D 5/189* (2013.01);
(Continued)

(58) Field of Classification Search
CPC .................................. F01D 5/186; F01D 5/189
See application file for complete search history.

(56) References Cited

U.S. PATENT DOCUMENTS 4,314,442 A 2/1982 Rice
5,207,556 A * 5/1993 Frederick ................ F01D 5/189
415/115
(Continued)

FOREIGN PATENT DOCUMENTS

EP 1085170 A2 3/2001
EP 1087103 A2 3/2001
(Continued)

OTHER PUBLICATIONS

European Search Report and Opinion issued in connection with corresponding EP Application No. 16187331.0 dated Jan. 26, 2017.
(Continued)

*Primary Examiner* — Edwin Kang
(74) *Attorney, Agent, or Firm* — Dority & Manning, P.A.

(57) ABSTRACT

One aspect the present subject matter is directed to a nozzle segment including a stator component having an airfoil. The airfoil includes a leading edge portion, a trailing edge portion, a pressure side wall and a suction side wall and a plurality of film holes in fluid communication with the radial cooling channel. A strut is disposed within the radial cooling channel and defines an inner radial cooling passage within the radial cooling channel. The strut defines a plurality of apertures that provide for fluid communication from the inner radial cooling passage to the radial cooling channel and the plurality of film holes provide for bore cooling of the airfoil of at least one of the pressure side wall or the suction side wall and provide for film cooling of the trailing edge portion of the airfoil between about fifty percent and one hundred percent of the chord length.

17 Claims, 9 Drawing Sheets

(51) Int. Cl.
*F01D 5/18* (2006.01)
*F01D 5/02* (2006.01)
*F01D 25/12* (2006.01)
*F02C 3/04* (2006.01)
*F02C 7/18* (2006.01)

(52) U.S. Cl.
CPC ............. *F01D 25/12* (2013.01); *F02C 3/04* (2013.01); *F02C 7/18* (2013.01); *F05D 2220/32* (2013.01); *F05D 2240/128* (2013.01); *F05D 2240/24* (2013.01); *F05D 2240/35* (2013.01); *F05D 2260/201* (2013.01); *F05D 2260/202* (2013.01); *F05D 2300/6033* (2013.01); *Y02T 50/60* (2013.01)

(56) References Cited

U.S. PATENT DOCUMENTS

| | | | |
|---|---|---|---|
| 5,702,232 A | 12/1997 | Moore | |
| 5,746,573 A * | 5/1998 | Junkin | F01D 11/001 415/115 |
| 5,839,878 A * | 11/1998 | Maier | F01D 11/005 415/209.2 |
| 6,238,183 B1 * | 5/2001 | Williamson | F01D 5/189 416/96 A |
| 6,325,593 B1 | 12/2001 | Darkins, Jr. et al. | |
| 6,554,563 B2 | 4/2003 | Noe et al. | |
| 6,769,866 B1 | 8/2004 | Kannefass | |
| 8,070,442 B1 | 12/2011 | Liang | |
| 8,096,767 B1 | 1/2012 | Liang | |
| 8,262,345 B2 | 9/2012 | Andrew | |
| 8,870,537 B2 | 10/2014 | Lee | |
| 2003/0180141 A1 * | 9/2003 | Kress | F01D 9/04 415/115 |
| 2004/0170498 A1 * | 9/2004 | Peterman | F01D 5/189 416/97 R |
| 2004/0208748 A1 * | 10/2004 | Schwartz | F01D 11/005 416/224 |
| 2005/0238491 A1 | 10/2005 | Morrison et al. | |
| 2008/0206046 A1 | 8/2008 | Razzell et al. | |
| 2010/0068034 A1 | 3/2010 | Schiavo et al. | |
| 2010/0166565 A1 | 7/2010 | Uskert et al. | |
| 2011/0250058 A1 * | 10/2011 | Suchezky | F01D 5/147 415/189 |
| 2012/0301312 A1 * | 11/2012 | Berczik | C04B 37/00 416/230 |
| 2013/0268244 A1 * | 10/2013 | Clark | G06F 17/5018 703/1 |
| 2014/0234088 A1 * | 8/2014 | Brandl | F01D 5/081 415/177 |
| 2015/0030461 A1 * | 1/2015 | Mugglestone | F01D 5/188 416/97 R |
| 2015/0377045 A1 * | 12/2015 | Chang | F01D 5/284 415/200 |

FOREIGN PATENT DOCUMENTS

| | | |
|---|---|---|
| JP | S56-72201 A | 6/1981 |
| JP | 5847103 A | 3/1983 |
| JP | H61-043927 A | 3/1986 |
| JP | 2015-038358 A | 2/2015 |
| JP | 2015-522752 A | 8/2015 |
| WO | 2011021693 A1 | 2/2011 |
| WO | 2012/157527 A1 | 11/2012 |
| WO | 2014158278 A2 | 10/2014 |
| WO | 2016111773 A1 | 7/2016 |

OTHER PUBLICATIONS

Machine Translation and a Notification of Reasons for Refusal issued in connection with corresponding JP Application No. 2016-174165 dated Jul. 4, 2017.

Machine Translation and a First Office Action and Search issued in connection with corresponding CN Application No. 201610822564.2 dated Jul. 26, 2017.

* cited by examiner

FIG. 2

STATOR COMPONENT COOLING

FIELD OF THE INVENTION

The present subject matter relates generally to a stator component for a gas turbine engine. More particularly, the present subject matter relates to cooling an airfoil portion of the stator component.

BACKGROUND OF THE INVENTION

A turbofan type gas turbine engine includes a gas turbine core having a low pressure compressor, high pressure compressor, combustor, a high pressure turbine and a low pressure turbine in serial flow relationship. The gas turbine is operable in a known manner to generate a primary gas flow. The high pressure turbine and the low pressure turbine generally include annular arrays ("rows") of stationary vanes or nozzles that direct combustion gases exiting the combustor downstream into a corresponding row of rotating turbine blades or buckets. Collectively, one row of nozzles and one row of turbine blades make up a "stage". Typically two or more stages are used in serial flow relationship.

The rows of stationary vanes and turbine blades operate at extremely high temperatures and must be cooled by air flow or other cooling medium to ensure adequate service life. The stationary vanes are often configured as an annular array of stator component having airfoils or airfoil-shaped vanes that extend radially between annular inner and outer bands which at least partially define a primary flow or hot gas path through the nozzle.

Due to the extreme operating temperatures within the gas turbine engine, it is desirable to utilize materials with a low coefficient of thermal expansion for the airfoils and/or the inner and outer bands. For example, to operate effectively in such strenuous temperature and pressure conditions, composite materials have been suggested, in particular for example, ceramic matrix composite (CMC) materials. The relatively low coefficient of thermal expansion CMC materials have higher temperature capability than metallic parts, thus allowing for higher operating temperatures within the engine resulting in higher engine efficiency.

As with metallic materials, CMC materials have a maximum temperature limit that is below the max combustion temperature of current commercial gas turbine engine. As a result, the stationary vanes formed from the CMC material must be cooled via a cooling medium such as compressed air that is routed through various cooling circuits defined within the stator components. If the cooling scheme or system is not configured correctly so as to properly control the flow of the cooling medium against the inner side of the airfoil, undesirable chordwise and/or through-wall thermal gradients may result. Therefore, an improved system for cooling the airfoil portion of the stator vane component formed from a CMC material would be desirable.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a nozzle segment such as for a gas turbine engine. The nozzle segment includes a stator component having an airfoil that extends radially between an inner band and an outer band. The stator component defines a radial cooling channel. The airfoil includes a leading edge portion, a trailing edge portion, a pressure side wall, a suction side wall and a plurality of film holes that are in fluid communication with the radial cooling channel. The nozzle segment further includes a strut that is disposed within the radial cooling channel and that defines an inner radial cooling passage within the radial cooling channel. The strut defines a plurality of apertures that provide for fluid communication from the inner radial cooling passage to the radial cooling channel. The plurality of apertures are arranged to provide impingement cooling to an inner surface of the airfoil between zero percent and about sixty percent of a chord length of the airfoil. The plurality of film holes provide for bore cooling of the airfoil of at least one of the pressure side wall or the suction side wall from about forty percent to about eighty percent of the chord length. In addition, the plurality of film holes provide for film cooling of the trailing edge portion of the airfoil.

Another aspect of the present subject matter is directed to a nozzle assembly. The nozzle assembly includes a plurality of nozzle segments annularly arranged and coupled together via an outer support ring and an inner support ring, each nozzle segment includes a stator component having an airfoil that extends radially between an inner band that is connected to the inner support ring and an outer band that is connected to the outer support ring. The stator component defines a radial cooling channel. The airfoil comprises a leading edge portion, a trailing edge portion, a pressure side wall, a suction side wall and defines a plurality of film holes that are in fluid communication with the radial cooling channel. A strut is disposed within the radial cooling channel and defines an inner radial cooling passage within the radial cooling channel. The strut defines a plurality of apertures that provide for fluid communication from the inner radial cooling passage to the radial cooling channel. The plurality of apertures are arranged to provide impingement cooling to an inner surface of the airfoil between zero percent and about sixty percent of a chord length of the airfoil. The plurality of film holes provide for bore cooling of the airfoil of at least one of the pressure side wall or the suction side wall from about forty percent to about eighty percent of the chord length. In addition, the plurality of film holes provide for film cooling of the trailing edge portion of the airfoil.

In another aspect of the present subject matter is directed to a gas turbine. The gas turbine includes a compressor, a combustor disposed downstream from the compressor and a turbine disposed downstream from the combustor. The turbine comprises a nozzle assembly that disposed upstream from a row of turbine blades. The nozzle assembly includes a plurality of nozzle segments annularly arranged and coupled together via an outer support ring and an inner support ring, each nozzle segment includes a stator component having an airfoil that extends radially between an inner band that is connected to the inner support ring and an outer band that is connected to the outer support ring. The stator component defines a radial cooling channel. The airfoil comprises a leading edge portion, a trailing edge portion, a pressure side wall, a suction side wall and defines a plurality of film holes that are in fluid communication with the radial cooling channel. A strut is disposed within the radial cooling channel and defines an inner radial cooling passage within the radial cooling channel. The strut defines a plurality of apertures that provide for fluid communication from the inner radial cooling passage to the radial cooling channel. The plurality of apertures are arranged to provide impingement cooling to an inner surface of the airfoil between zero percent and about sixty percent of a chord length of the airfoil. The plurality of film holes provide for bore cooling of the airfoil of at least one of the pressure side wall or the suction side wall from about forty percent to about eighty percent of the chord length. In addition, the plurality of film holes provide for film cooling of the trailing edge portion of the airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 is a perspective view of an exemplary nozzle ring assembly as may incorporate various embodiments of the present invention;

DETAILED DESCRIPTION OF THE INVENTION

Figure 1:
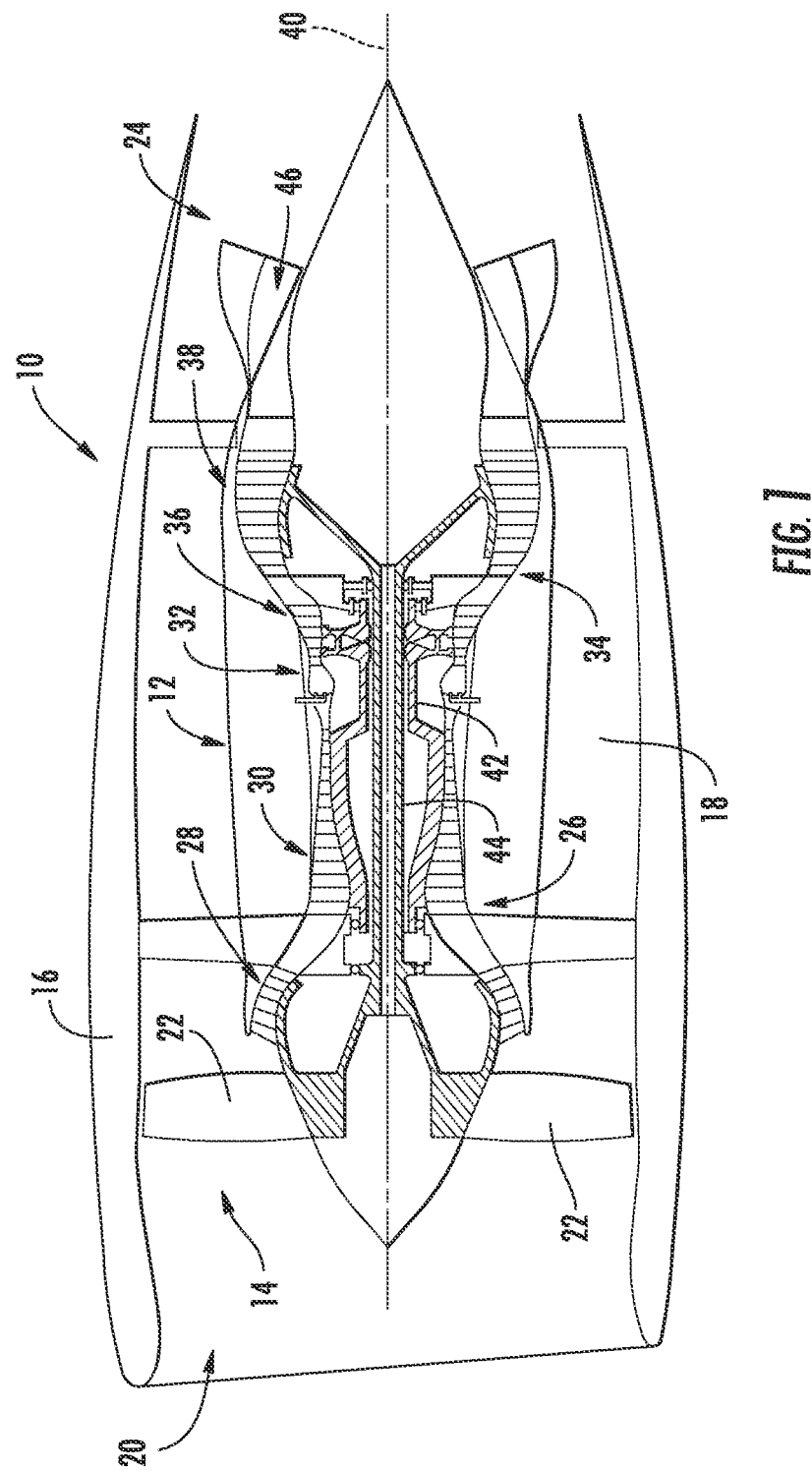
FIG. 1 is a schematic cross-sectional view of an exemplary high bypass turbofan jet engine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear of the engine. As used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring now to the drawings, wherein identical numerals indicate the same elements throughout the figures, FIG. 1 is a schematic cross-sectional view of an exemplary high by-pass turbofan type engine or "turbofan" 10, as may incorporate various embodiments of the present invention. The turbofan 10 generally includes a gas turbine engine or propulsor 12, a fan section 14 that is mechanically coupled to the gas turbine engine 12 and a nacelle or outer casing 16 that extends circumferentially around at least a portion of the gas turbine engine 12. The nacelle 16 and the gas turbine engine 12 at least partially define a high by-pass duct 18 through the turbofan 10. The function of the gas turbine engine 12 is to extract energy from high pressure and temperature combustion gases and convert the energy into mechanical energy for work.

The nacelle 16 at least partially defines an inlet 20 of the turbofan 10. Air enters the turbofan 10 via the inlet 20 and passes across a plurality of fan blades 22 of the fan section 14. A primary portion of the air flows through the high by-pass duct 18 and is exhausted from an outlet or aft end 24 of the turbofan 10, thus providing a large portion of the overall thrust produced by the turbofan 10.

A secondary portion of the air is routed into a compressor section 26 of the gas turbine engine 12. The compressor section 26 generally includes, in serial flow order, a low pressure (LP) axial-flow compressor 28 and a high pressure (HP) axial-flow compressor 30. A combustion section 32 is disposed downstream from the compressor section 26 and a multi-stage turbine 34 is disposed downstream from the combustion section 32.

The multi-stage turbine 34 may include a high pressure (HP) turbine 36 and a low or lower pressure (LP) turbine 38 disposed downstream from the HP turbine 36. The compressor portion 26, the combustion section 32 and the multi-stage turbine 34 are all located along an engine axis 40. The HP turbine 26 is connected to the HP compressor 30 via rotor shaft 42. The LP turbine is connected to the LP compressor 28 via rotor shaft 44. The fan blades 22 may be connected to rotor shaft 44 via a reduction gear or may be coupled to rotor shaft 44 via various mechanical/structural means.

In operation, the compressed air from the compressor section 26 is mixed with fuel and burned in the combustion section 32, thus providing hot combustion gas which exits the combustion section 32 and flows into the HP turbine 36 of the multi-stage turbine 34. At the HP turbine 36, kinetic and thermal energy is extracted from the hot combustion gas causing rotation of turbine blades disposed within the HP turbine 36 which in turn causes rotation of rotor shaft 42. Rotation of rotor shaft 42 supports operation of the HP compressor 30. The combustion gas then flows from the HP turbine 36 to the LP turbine 38 where additional kinetic and thermal energy is extracted from the hot combustion gas causing rotation of turbine blades which in turn causes rotation of rotor shaft 44. The combustion gas is then exhausted from the multi-stage turbine 34 via turbine exhaust duct 46. Rotation of rotor shaft 44 supports operation of LP compressor 28 and causes rotation of the fan blades 22. Collectively, the gas turbine engine 12 and the fan section 14 contribute to produce overall thrust and/or power generated by the turbofan 10.

Figure 2:
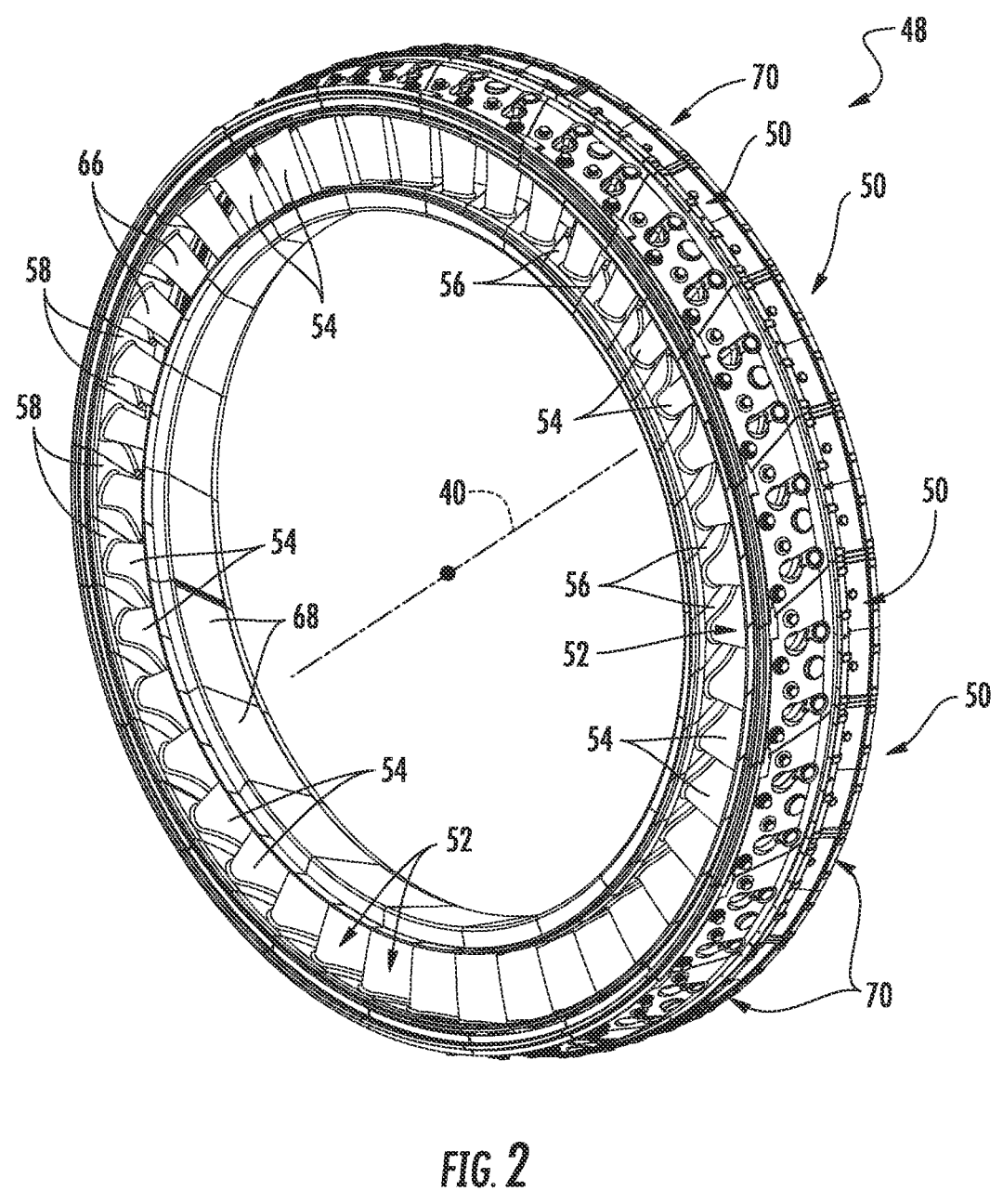

FIG. 2 provides a perspective view of an exemplary nozzle ring assembly 48 as may incorporate various embodiments of the present invention. The nozzle ring assembly 48 may be located within the HP turbine 36 or the LP turbine 38 (FIG. 1). Additionally, one or more nozzle ring assemblies may be utilized in the LP compressor 28 and/or the HP compressor 30. When incorporated into the HP turbine 36 or the LP turbine 38, the nozzle ring assembly 48 directs the combustion gas downstream through a subsequent row of rotor blades (not shown) extending radially outwardly from a supporting rotor shaft such as rotor shafts 42 and 44 (FIG. 1).

Figure 3:
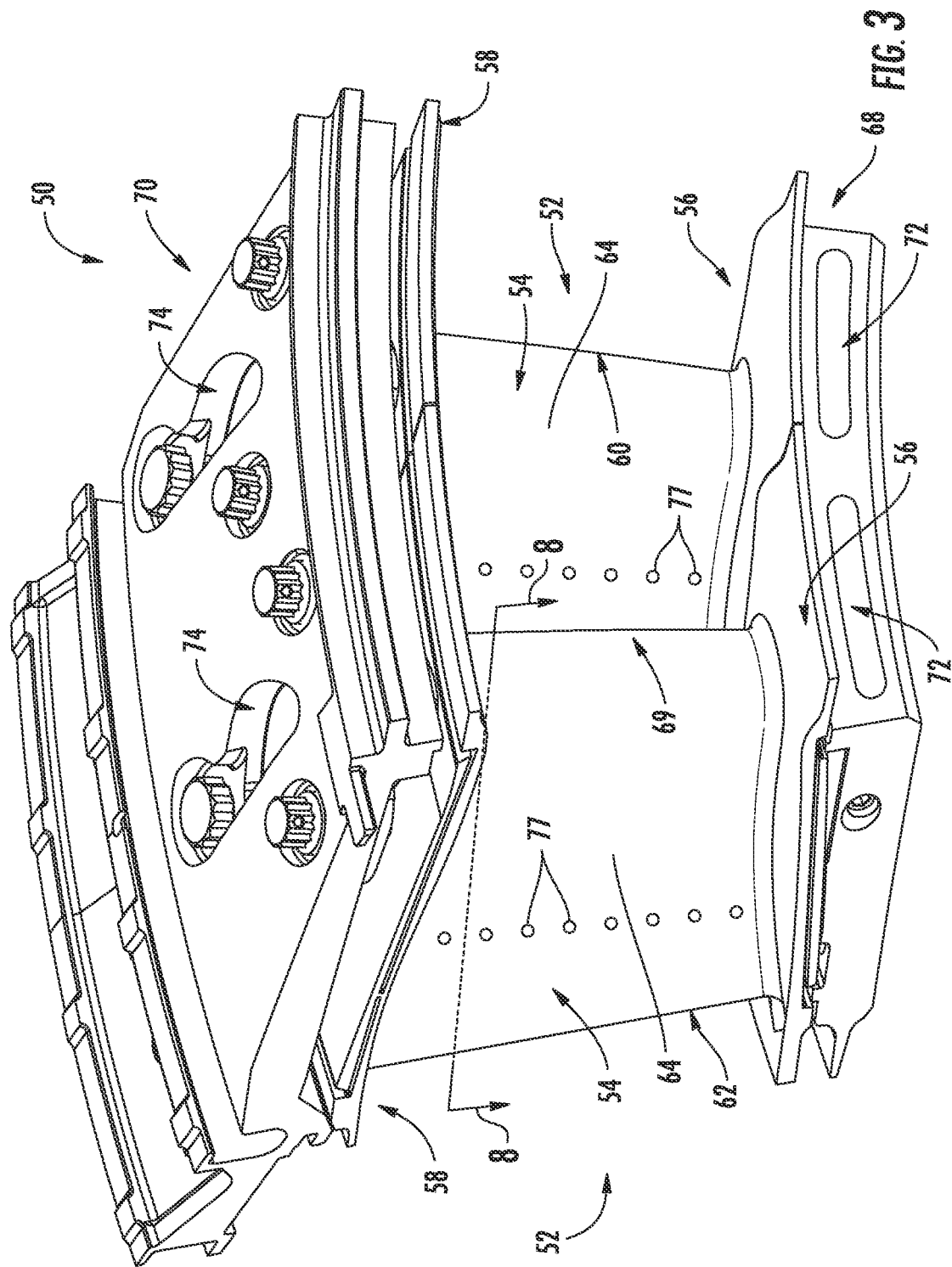
FIG. 3 is a perspective view of an exemplary nozzle segment of the nozzle ring assembly as shown in FIG. 2.

As shown in FIG. 2, the nozzle ring assembly 48 is formed of one or more nozzle segments 50. FIG. 3 provides a perspective view of an exemplary nozzle segment 50 as shown in FIG. 2, as may incorporate various embodiments of the present disclosure. As shown in FIGS. 2 and 3, each nozzle segment 50 includes at least one stator component 52. For example, in the exemplary embodiment, as shown in FIGS. 2 and 3, each nozzle segment 50 may include two stator components 52 in a "doublet" configuration. In other configurations, each nozzle segment 50 may include one stator component 52 in a "singlet" configuration (not shown).

As shown in FIGS. 2 and 3, each stator component 52 generally includes a vane or airfoil 54 that extends substantially radially in span with respect to axis 40 between an inner band 56 and an outer band 58 of the stator component 52. The inner and outer bands 56, 58 define inner and outer flow boundaries for the combustion gas flowing through the nozzle segment assembly 50.

As shown in FIG. 3, each airfoil 54 includes a leading edge portion 60, a trailing edge portion 62, a generally concave pressure side wall 64 and a generally convex suction side wall 66 (FIG. 2). In particular embodiments, at least a portion of the stator component 52, including the inner band 56, the outer band 58 and/or the airfoil 54 may be formed from a relatively low coefficient of thermal expansion material, including but not limited to a ceramic matrix composite (CMC).

In particular embodiments, as shown in FIGS. 2 and 3, each nozzle segment 50 includes and/or is attached to an inner support ring(s) 68 disposed radially inwardly from the inner band(s) 56 and a hanger or outer support ring(s) 70 disposed radially outwardly from the outer bands 58. The inner support rings 68 and/or the outer support rings 70 may provide structural or mounting support for each stator component 52 and/or the corresponding nozzle segment 50.

In particular embodiments, as shown in FIG. 3, the inner support ring 68 defines at least one rotor purge air passage 72 and/or the outer support ring 70 defines at least one cooling flow inlet 74 that is in fluid communication with a cooling medium source and with the purge air passage 72. The purge air passage 72 allows the cooling air to exit the inner support ring 68 in either or both of a circumferential or axial direction. As shown in FIG. 2, the inner and outer bands 56, 58, the inner support ring 68 and the hanger or outer support ring 70 extend 360 degrees about the nozzle ring assembly 48 with respect to the engine axis 40.

Figure 4:
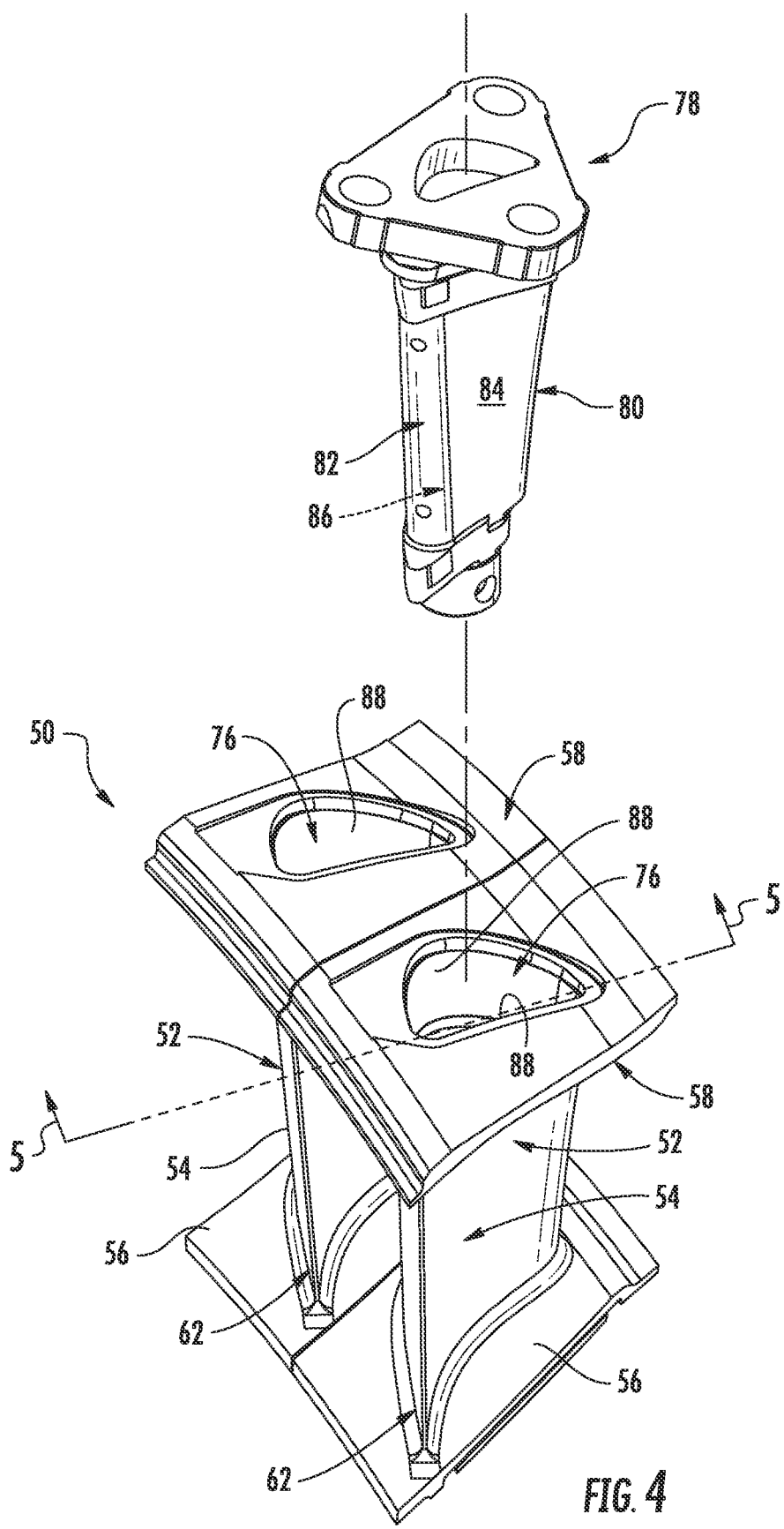
FIG. 4 is an exploded view of a portion of the nozzle segment as shown in FIG. 3 according to one or more embodiment of the present invention.

FIG. 4 provides an exploded perspective view of a portion of the exemplary nozzle segment 50 as provided in FIG. 3 with the inner support ring 68 and the outer support ring 70 removed for clarity, according to various embodiments of the present disclosure. In various embodiments, as shown in FIG. 4, each stator component 52 includes a radial cooling channel 76. The radial cooling channel 76 extends and/or is defined radially through the outer band 58, the airfoil 54 and the inner band 56. In particular embodiments, the radial cooling channel 76 is in fluid communication with the cooling flow inlet 74 (FIG. 3). In particular embodiments, the radial cooling channel 76 is in fluid communication with the rotor purge air passage 72 (FIG. 3). In the exemplary embodiment, as shown in FIG. 4, the stator component 52 comprises a single radial cooling channel 76.

In various embodiments, as shown in FIG. 3, the airfoil 54 may include a plurality of film holes 77 defined along an outer surface of the airfoil 54 and in fluid communication with the radial cooling channel 76 to provide film cooling to the outer surfaces and/or portions of the airfoil 54. In addition, the film holes 77 provide for localized bore or through-hole cooling of the airfoil 54. For example, as shown in FIG. 3, the airfoil 54 may include a plurality of film holes 77 along the pressure side wall 64 and/or the suction side wall 66 (not shown). The film holes 77 allow for localized bore or through-hole cooling of the airfoil 54 where hotspots may form. In one embodiment, the film holes 77 may provide for bore cooling from about 50 percent to about 80 percent of the chord line.

Other locations of the airfoil 54 may further comprise film holes 77 in order to provide a desirable operating temperature for the airfoil 54. In particular embodiments, the airfoil 54 may include between 1 and 4 radially and/or axially spaced rows of the film holes 77. In particular embodiments, the films holes 77 may be from about 10 to about 30 mils in diameter. In particular embodiments, the rows of film holes 77 may be separated by about 1 to about 4 airfoil wall thicknesses of the airfoil 54.

Figure 5:
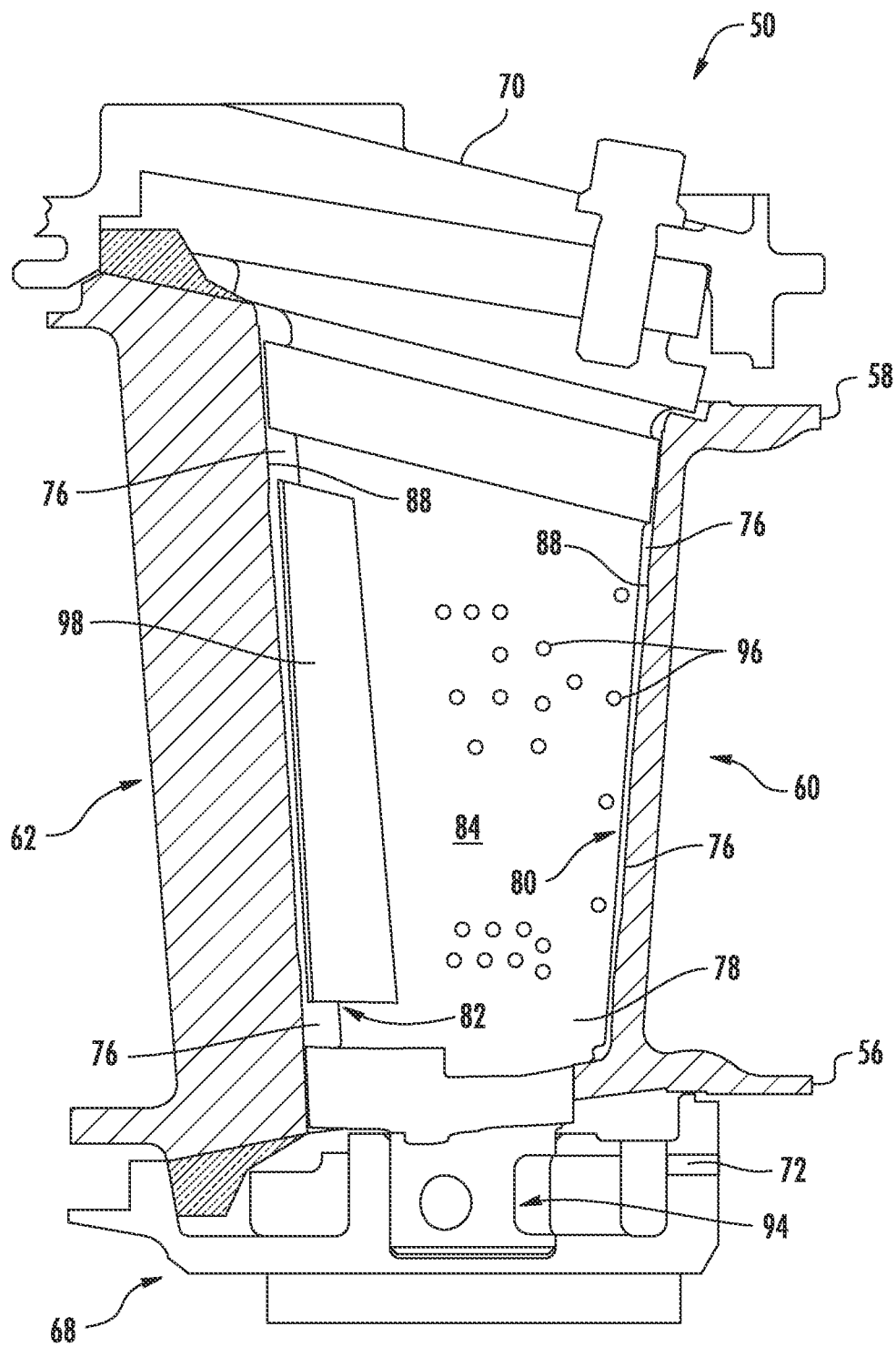
FIG. 5 is a cross sectional side view of the nozzle segment as shown in FIG. 3, according to at least one embodiment of the present invention.

FIG. 5 provides a cross sectioned side view of the nozzle segment 50 as shown in FIG. 3, according to various embodiments of the present disclosure. In various embodiments, as shown in FIGS. 4 and 5, at least one nozzle segment 50 includes an insert or strut 78. When installed, as shown in FIG. 5, the strut 78 is positioned inside the radial cooling channel 76. The strut 78 may be connected to and/or in contact with the inner support ring 68 and/or the outer support ring 70.

The strut 78 generally includes a forward portion 80 and an aft portion 82. The strut 78 further includes a pressure side portion 84 that extends between the forward and aft portions 80, 82 chord-wise and in span and a suction side portion 86 that extends between the forward and aft portions 80, 82 chord-wise and in span. In particular embodiments, one or more of the forward portion 80, aft portion 82, pressure side portion 84 and the suction side portion 86 are formed or shaped to be substantially complimentary with an inner surface 88 (FIG. 4) of the airfoil 54.

Figure 6:
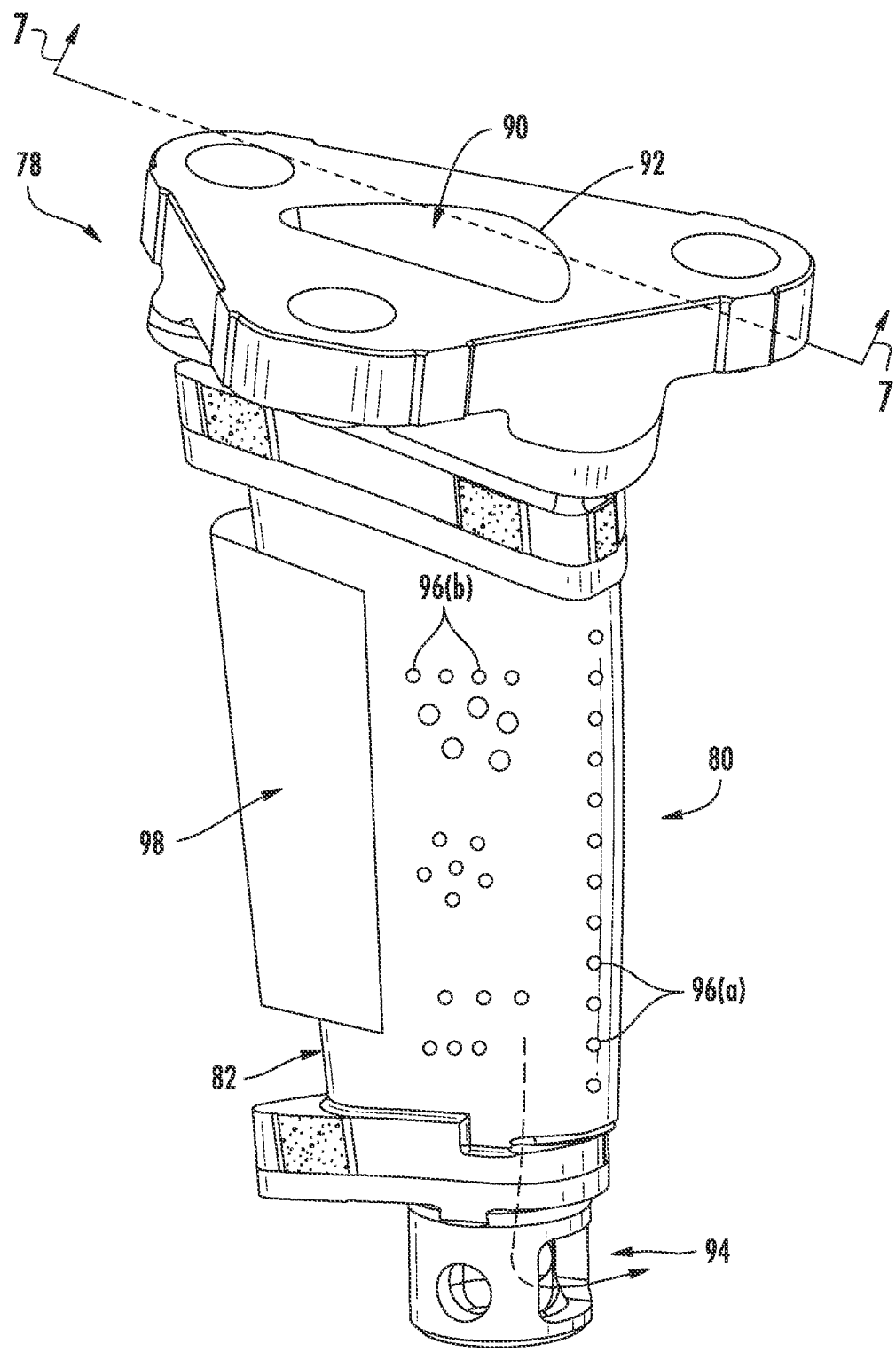
FIG. 6 is a perspective view of an exemplary insert of the nozzle segment as shown in FIG. 5, according to at least one embodiment of the present invention.
Figure 7:
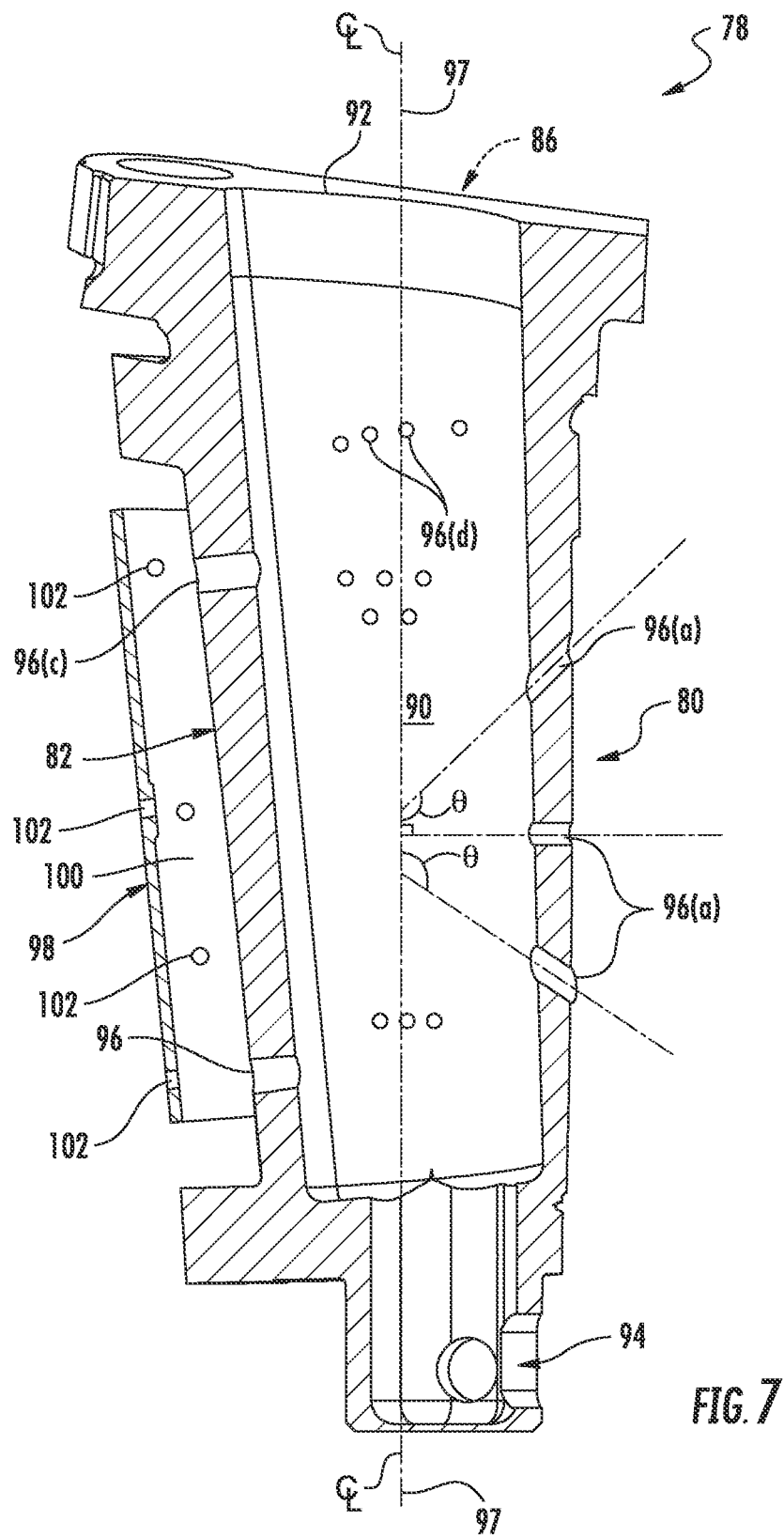
FIG. 7 is a cross sectional side view of an exemplary insert of the nozzle segment according to at least one embodiment of the present invention.

FIG. 6 is a perspective view of the strut 78 as shown in FIG. 5 removed from the nozzle segment 50 for clarity according to various embodiments of the present disclosure. FIG. 7 is a cross sectional side view of the strut 78 taken along section line 7 as shown in FIG. 6. As shown in FIGS. 6 and 7, the strut 78 defines an inner radial cooling passage 90. The strut 78 defines and/or includes an inlet 92 to the inner radial cooling passage 90. In particular embodiments, the inlet 92 is in fluid communication with the cooling medium source via the cooling air inlet 74 of the outer support ring 70. The strut 78 may also include an outlet 94 that is in fluid communication with the inner radial cooling passage 90. The outlet 94 may be in fluid communication with the purge air passage 72 of the inner support ring 68 (FIG. 5).

In various embodiments, as shown in FIGS. 6 and 7 collectively, the strut 78 includes and/or defines a plurality of apertures 96(a-d). Apertures indicated as 96(a) are generally formed along the forward portion 80 of the strut 78, 96(b) are formed along the pressure side portion 84 of the strut 78, 96(c) are formed along the aft portion 82 of the strut 78 and 96(d) are formed along the suction side portion 86 of the strut 78. The apertures 96(a-d) provide for fluid communication from the inner radial cooling passage 90 through the strut 78 and into the radial cooling channel 76 of the airfoil 54. Any of the apertures 96(a-d) may be formed and/or angled so as to provide impingement or jet cooling to the inner surface 88 of the airfoil 54.

As shown in FIG. 7, in particular embodiments, at least one of the apertures 96(a-d) particularly shown but not limited to apertures 96(a) may be formed so as to direct a flow of compressed air at the inner surface 88 of the airfoil (FIG. 8) at an angle Θ measured with respect to radial centerline 97 which is generally perpendicular with engine axis 40. For example, in particular embodiments, at least one aperture 96(a) may be formed at an angle Θ that is acute with respect to a right angle formed with radial centerline 97, substantially perpendicular to radial centerline 97 or at an angle Θ that is obtuse with respect to a right angle formed with radial centerline 97.

In particular embodiments, as shown in FIGS. 5, 6 and 7, a deflector shield or baffle 98 extends span-wise and chord-wise from the pressure side portion 84 around the aft portion 82 and to the suction side portion 86 of the strut 78. In particular embodiments, the baffle 98 may extend radially in span between about 50 to 100 percent of the total radial span of the strut 78. In one embodiment, the baffle 98 may have a thickness that is from about 5 to about 30 mils. The baffle 98 may be attached to the strut 78 via welded through-wall pins, with or without brazed edges or by any known suitable attaching means.

As shown in FIG. 7, the baffle 98 generally defines a flow passage 100 between the aft portion 82 of the strut 78 and the baffle 98. The flow passage 100 may be in fluid communication with the inner radial cooling passage 90 via one or more of the apertures 96(a-d). In particular embodiments, the flow passage 100 may be in fluid communication with the radial cooling channel 76 of the stator component 52. In particular embodiments, the baffle 98 may include and/or define one or more exhaust holes 102.

Figure 8:
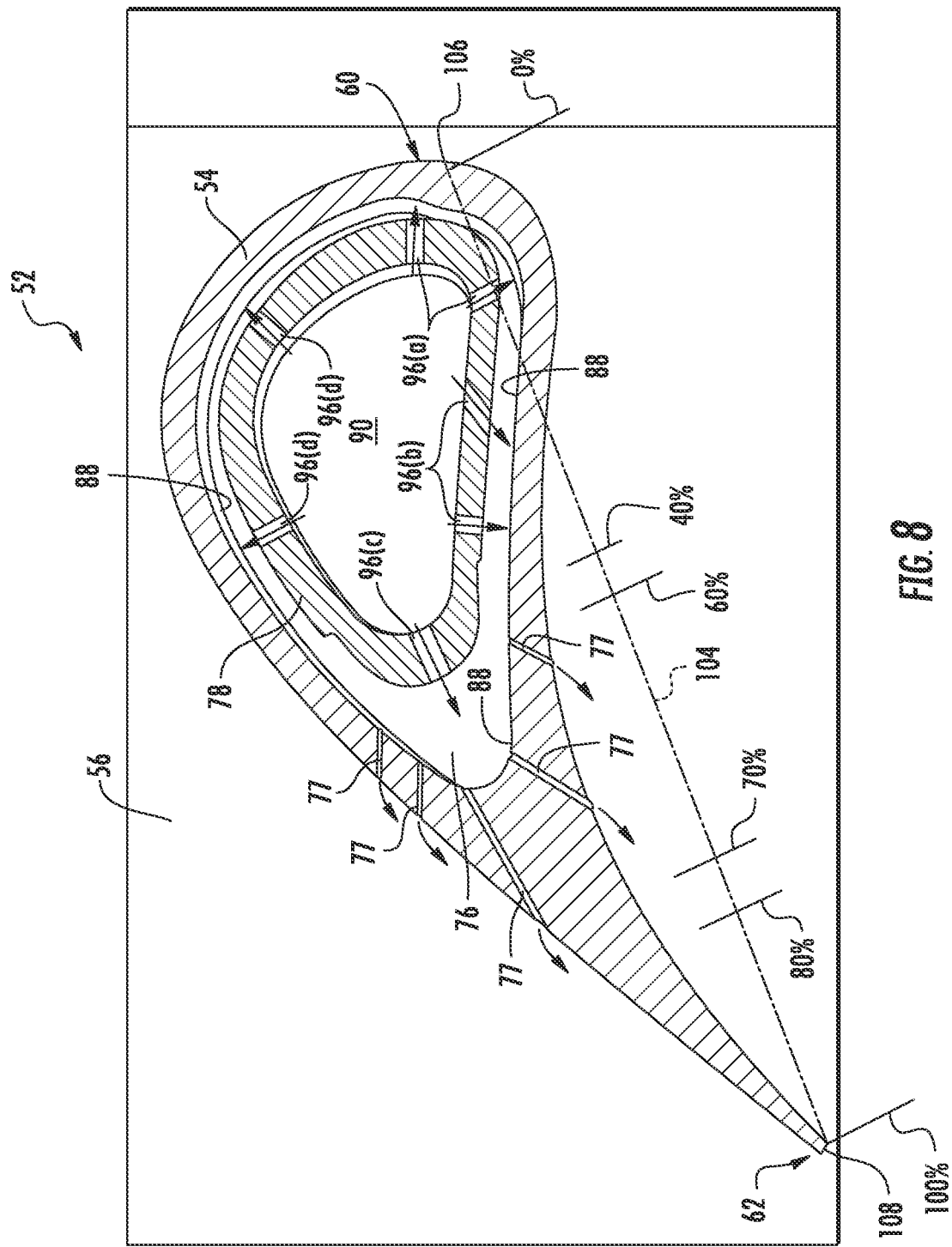
FIG. 8 is a cross sectional top view of a stator component of the nozzle segment as shown in FIG. 3, according to at least one embodiment of the present invention.
Figure 9:
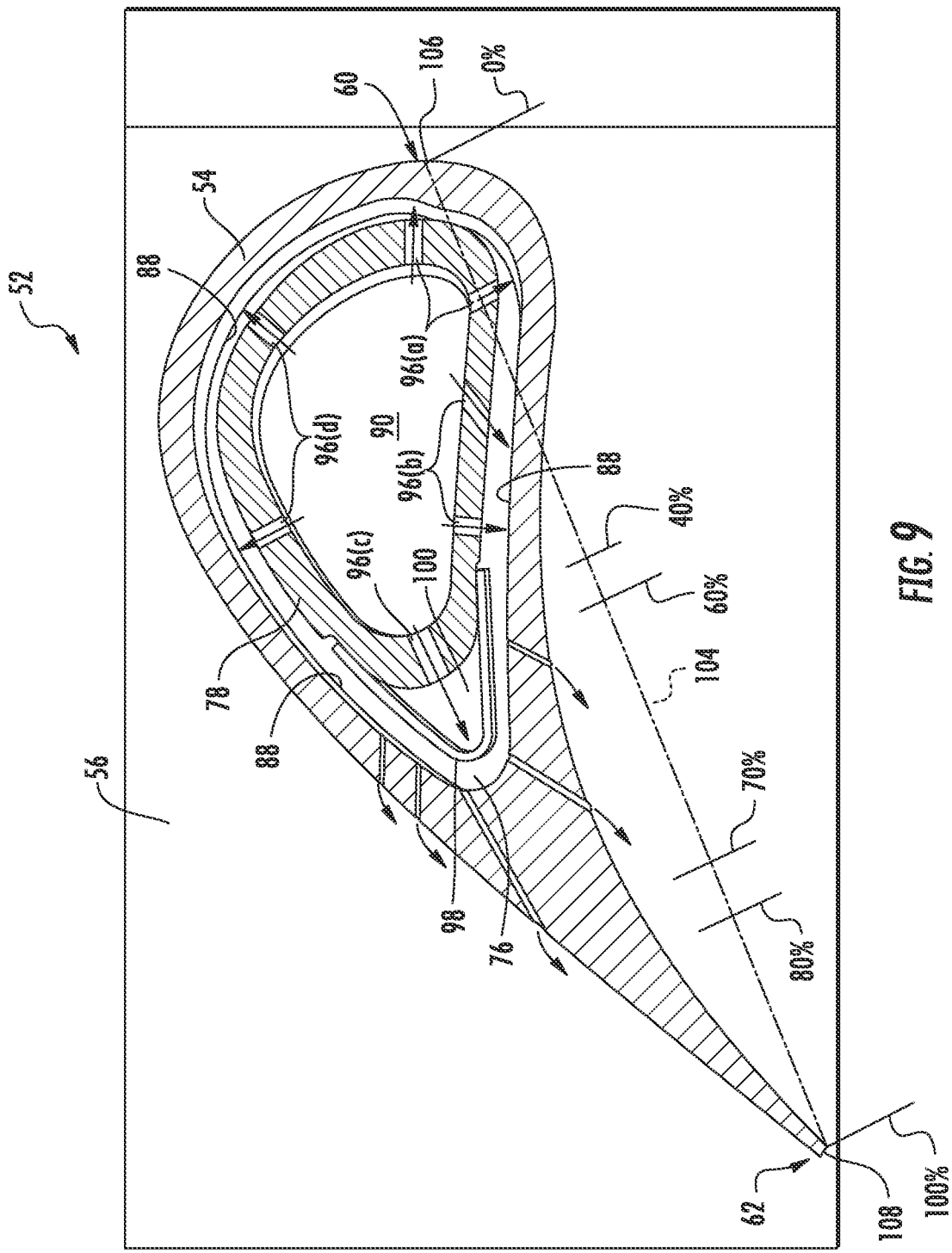
FIG. 9. is a cross sectional top view of a stator component of the nozzle segment as shown in FIG. 3, according to at least one embodiment of the present invention.

As previously presented herein, the proper positioning of the apertures 96(a-d) and/or the film holes 77 is important for preventing undesirable chordwise and/or through-wall thermal gradients in the airfoil 54 which result, at least in part, from a large temperature differential between compressed air flowing from the strut 78 against the inner surface 88 of the airfoil 54 and the temperature of the combustion gases flowing across the outer surface of the airfoil 54. FIG. 8 provides a cross sectional top view of one of the stator components 52 taken along section line 8-8 as shown in FIG. 3 including the airfoil 54, the strut 78, and the inner band 56, according to at least one embodiment of the present invention. FIG. 9 provides a cross sectional top view of one of the stator components 52 as shown in FIG. 8 including the airfoil 54, the strut 78, the baffle 98 and the inner band 56, according to at least one embodiment of the present invention.

As shown in FIGS. 8 and 9, a chord line 104 is defined from the leading edge portion 60 to the trailing edge portion 62 of the airfoil 54. A distance taken between a starting point 106 of the chord line 104 and a termination point 108 of the chord line 104 is representative of one hundred percent of the chord length of the airfoil 54.

In one embodiment, the stator component 52 is formed form a Ceramic Matrix Composite material. As shown in FIG. 8, the apertures 96(a-d) are positioned along the strut 78 between zero percent of the chord length and about sixty percent of the chord length of the airfoil 54 so as to provide impingement and/or convective cooling to the inner surface 88 of the airfoil 54. The film holes 77 are positioned along the airfoil 54 between about forty percent of the chord length of the airfoil 54 and about eighty percent of the chord length so as to provide film cooling to the pressure side wall 64 and/or the suction side wall 66. In particular embodiments, the trailing edge portion 62 of the airfoil 54 is solid (without film holes) between about seventy percent of the chord length and one hundred percent of the chord length. In one embodiment, the apertures 96(a-d) are disposed between zero and sixty percent of the chord length, the film holes 77 are disposed between forty percent and eighty percent of the chord length and the trailing edge portion 62 of the airfoil 54 is solid from eighty percent of the chord length to the termination point 108 or one hundred percent of the chord line 104.

In one embodiment, as shown in FIG. 9, the baffle 98 is connected to the strut 78 so as to prevent direct impingement cooling of the inner surface 88 of the airfoil 54 aft of the aft portion of the strut 78. In particular embodiments, the baffle 98 includes one or more of the exhaust holes 102 (FIG. 7). The apertures 96(a-d) are positioned along the strut 78 between zero percent of the chord length and about sixty percent of the chord length of the airfoil 54 so as to provide impingement and/or convective cooling to the inner surface 88 of the airfoil 54. The film holes 77 are positioned along the airfoil 54 between about forty percent of the chord length of the airfoil 54 and about eighty percent of the chord length so as to provide film cooling to the pressure side wall 64 and/or the suction side wall 66. In particular embodiments, the trailing edge portion 62 of the airfoil 54 is solid between about seventy percent of the chord length and one hundred percent of the chord length. In one embodiment, the apertures 96(a-d) are disposed between zero and sixty percent of the chord length, the film holes 77 are disposed between forty percent and eighty percent of the chord length and the trailing edge portion 62 of the airfoil 54 is solid from eighty percent of the chord length to the termination point 108 of the chord line 104.

Now referring to FIGS. 2-9 collectively, during operation, a cooling medium such as compressed air is directed through the inlet 92 of the strut 78 and into the inner radial cooling passage 90. The compressed air flows radially inwardly towards the outlet 94 of the strut 78. A portion of the compressed air as indicated by arrows flows through the various apertures 96(a-d) defined within the strut 78 and is impinged upon or directed towards the inner surface 88 of the airfoil 54 at various locations defined along the inner surface 88 of the airfoil 54 between zero percent and about 60 percent of the chord length, thus providing backside cooling to the airfoil 54.

In particular embodiments, as illustrated in FIG. 9, a portion of the compressed air is routed from the inner radial cooling passage 90 into the flow passage 100 defined by the baffle 98, thus preventing direct impingement cooling of the inner surface 88 of the airfoil 54 aft of the aft portion 82 of the strut 78. The compressed air may then flow from the flow passage 100 into the radial cooling channel 76, thus providing convection cooling to the inner surface 88 of the airfoil 54. As shown in FIGS. 8 and 9, at least a portion of the compressed air is then exhausted through the airfoil 54 from the film holes 77, thus providing bore or through-hole cooling and/or film cooling to various portions of the airfoil 54. A remaining portion of the compressed air may be routed from the outlet 94 of the strut 78 into the rotor purge air passage 72.

The arrangement of the various apertures 96(a-d), the film holes 77 and the baffle 98 provide various technical benefits over known cooling schemes for airfoils of a stator component of a nozzle segment. For example, by positioning the apertures 96(a-d) to provide impingement cooling to the inner surface 88 of the airfoil 54 from zero to about 60 percent of the cord length of the airfoil 54, temperatures found within the radial cooling channel 76 may be closely matched with the temperature of the trailing edge temperatures, thus reducing through-wall and/or chordwise temperature gradients. In addition or in the alternative, the positioning of the apertures 96(a-d) provides flow to the trailing edge portion 62 of the airfoil 54 and to the inner and outer bands 56, 58 without requiring additional cooling to the leading edge portion 62 of the airfoil 54.

The baffle 98 may provide a flow path for dedicated trailing edge 62 and inner and outer band 56, 58 cooling flow while potentially reducing direct impact on airfoil 54 stresses. The solid trailing edge portion 62 may be at least partially enabled by the cooling configuration provided herein. More specifically, the solid trailing edge portion 62 may be at least partially enabled by using impingement, bore and film cooling along the provided percentages of the chord length of the airfoil 54 to reduce airfoil temperature gradients between the cavity and trailing edge.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A nozzle segment, comprising:
   a stator component having an airfoil that extends radially between an inner band and an outer band, the stator component defining a radial cooling channel, the airfoil comprising a leading edge portion, a trailing edge portion, a pressure side wall and a suction side wall and a plurality of film holes in fluid communication with the radial cooling channel; and
   a strut disposed within the radial cooling channel and defining an inner radial cooling passage within the radial cooling channel, the strut defining a plurality of apertures that provide for fluid communication from the inner radial cooling passage to the radial cooling channel;
   wherein the plurality of apertures are positioned and arranged along one or more portions of the strut that are only within up to a first sixty percent of a chord length so as to provide impingement cooling to an inner surface of the airfoil, the chord length measured along a chord line from a starting point at the leading edge portion of the airfoil to a termination point at the trailing edge portion of the airfoil;
   wherein the plurality of film holes provide for bore cooling of the airfoil of at least the suction side wall, wherein the plurality of film holes are positioned along the airfoil at a location only from forty percent along the chord length to up to eighty percent along the chord length, as measured along the chord line from the starting point at the leading edge portion of the airfoil;
   wherein the plurality of film holes provide for film cooling of the trailing edge portion of the airfoil; and
   wherein the trailing edge portion of the airfoil, including an interior of the trailing edge portion, is solid from a location corresponding to eighty percent of the chord length of the airfoil to the termination point at the trailing edge portion of the airfoil, as measured along the chord line from the starting point at the leading edge portion of the airfoil.

2. The nozzle segment as in claim 1, wherein the stator component is formed from a ceramic matrix composite material.

3. The nozzle segment as in claim 1, further comprising a baffle connected to the strut, wherein the baffle extends radially in span and chordwise about an aft portion of the strut and defines a flow passage between the baffle and the strut.

4. The nozzle segment as in claim 3, wherein the flow passage of the baffle is in fluid communication with the inner radial cooling passage and the radial cooling channel.

5. The nozzle segment as in claim 3, wherein the baffle defines a plurality of exhaust holes, wherein the plurality of exhaust holes provide for fluid communication from the flow passage through the baffle and into the radial cooling channel.

6. The nozzle segment as in claim 1, further comprising a baffle connected to the strut so as to prevent direct impingement cooling of the inner surface of the airfoil aft of an aft portion of the strut.

7. The nozzle segment as in claim 6, wherein the baffle extends radially in span from fifty percent to less than one-hundred percent of a total radial span of the strut.

8. The nozzle segment as in claim 7, wherein the baffle provides fluid communication between the inner radial cooling passage and the radial cooling channel at a radially inward portion of the baffle and/or at a radially outward portion of the baffle.

9. A nozzle assembly, comprising:
a plurality of nozzle segments annularly arranged and coupled together via an outer support ring and an inner support ring, each nozzle segment comprising:
a stator component having an airfoil that extends radially between an inner band connected to the inner support ring and an outer band connected to the outer support ring, the stator component defining a radial cooling channel, the airfoil comprising a leading edge portion, a trailing edge portion, a pressure side wall and a suction side wall and a plurality of film holes in fluid communication with the radial cooling channel; and
a strut disposed within the radial cooling channel and defining an inner radial cooling passage within the radial cooling channel, the strut defining a plurality of apertures that provide for fluid communication from the inner radial cooling passage to the radial cooling channel;
wherein the plurality of apertures are positioned and arranged along one or more portions of the strut that are only within up to a first sixty percent of a chord length the strut so as to provide impingement cooling to an inner surface of the airfoil, the chord length measured along a chord line from a starting point at the leading edge portion of the airfoil to a termination point at the trailing edge portion of the airfoil;
wherein the plurality of film holes provide for bore cooling of the airfoil of at least the suction side wall, wherein the plurality of film holes are positioned along the airfoil at a location only from forty percent along the chord length to up to eighty percent along the chord length, as measured along the chord line from the starting point at the leading edge portion of the airfoil;
wherein the plurality of film holes provide for film cooling of the trailing edge portion of the airfoil from a location corresponding to fifty percent of the chord length to eighty percent of the chord length of the airfoil, as measured along the chord line from the starting point at the leading edge portion of the airfoil; and
wherein the trailing edge portion of the airfoil, including an interior of the trailing edge portion, is solid from a location corresponding to eighty percent of the chord length of the airfoil to the termination point at the trailing edge portion of the airfoil, as measured along the chord line from the starting point at the leading edge portion of the airfoil.

10. The nozzle assembly as in claim 9, wherein the stator component is formed from a ceramic matrix composite material.

11. The nozzle assembly as in claim 9, wherein each nozzle segment further comprises a baffle connected to the strut, wherein the baffle extends radially in span and chordwise about an aft portion of the strut and defines a flow passage between the baffle and the strut.

12. The nozzle assembly as in claim 11, wherein the flow passage of the baffle is in fluid communication with the inner radial cooling passage and the radial cooling channel.

13. The nozzle assembly as in claim 11, wherein the baffle defines a plurality of exhaust holes, wherein the plurality of exhaust holes provide for fluid communication from the flow passage through the baffle and into the radial cooling channel.

14. A gas turbine, comprising:
a compressor;
a combustor disposed downstream from the compressor; and
a turbine disposed downstream from the combustor, wherein the turbine comprises a nozzle assembly disposed upstream from a row of turbine blades, the nozzle assembly having a plurality of nozzle segments annularly arranged and coupled together via an outer support ring and an inner support ring, each nozzle segment comprising:
a stator component having an airfoil that extends radially between an inner band connected to the inner support ring and an outer band connected to the outer support ring, the stator component defining a radial cooling channel, the airfoil comprising a leading edge portion, a trailing edge portion, a pressure side wall and a suction side wall and a plurality of film holes in fluid communication with the radial cooling channel; and
a strut disposed within the radial cooling channel and defining an inner radial cooling passage within the radial cooling channel, the strut defining a plurality of apertures that provide for fluid communication from the inner radial cooling passage to the radial cooling channel;
wherein the plurality of apertures are positioned and arranged along one or more portions of the strut that are only within up to a first sixty percent of a chord length so as to provide impingement cooling to an inner surface of the airfoil, the chord length measured along a chord line from a starting point at the leading edge portion of the airfoil to a termination point at the trailing edge portion of the airfoil;
wherein the plurality of film holes provide for bore cooling of the airfoil of at least the suction side wall, wherein the plurality of film holes are positioned along the airfoil at a location only from forty percent along the chord length to up to eighty percent along the chord length, as measured along the chord line from the starting point at the leading edge portion of the airfoil;
wherein the plurality of film holes provide for film cooling of the trailing edge portion of the airfoil from a location corresponding to fifty percent of the chord length to eighty percent of the airfoil, as measured along the chord line from the starting point at the leading edge portion of the airfoil; and
wherein the trailing edge portion of the airfoil, including an interior of the trailing edge portion, is solid from a location corresponding to eighty percent of the chord length of the airfoil to the termination point at the trailing edge portion of the airfoil, as measured along the chord line from the starting point at the leading edge portion of the airfoil.

15. The gas turbine as in claim 14, wherein the stator component is formed from a ceramic matrix composite material.

16. The gas turbine as in claim 14, wherein each nozzle segment further comprises a baffle connected to the strut, wherein the baffle extends radially in span and chordwise about an aft portion of the strut and defines a flow passage between the baffle and the strut, wherein the flow passage of the baffle is in fluid communication with the inner radial cooling passage and the radial cooling channel.

17. The gas turbine as in claim 16, wherein the baffle defines a plurality of exhaust holes, wherein the exhaust holes provide for fluid communication from the flow passage through the baffle and into the radial cooling channel.

* * * * *